US012686320B2

(12) United States Patent
Metternich

(10) Patent No.: US 12,686,320 B2
(45) Date of Patent: Jul. 21, 2026

(54) CONTAINER LOCKING DEVICE AND CONTAINER LOCKING METHOD

(71) Applicant: Hamburger Patent Schmiede GmbH, Buchholz (DE)

(72) Inventor: Heinz-Ruediger Metternich, Eversen-Heide (DE)

(73) Assignee: Hamburger Patent Schmiede GmbH, Buchholz (DE)

( * ) Notice: Subject to any disclaimer, the term of this patent is extended or adjusted under 35 U.S.C. 154(b) by 375 days.

(21) Appl. No.: 18/561,136

(22) PCT Filed: May 3, 2022

(86) PCT No.: PCT/DE2022/100337
§ 371 (c)(1),
(2) Date: Nov. 15, 2023

(87) PCT Pub. No.: WO2022/242792
PCT Pub. Date: Nov. 24, 2022

(65) Prior Publication Data
US 2024/0262281 A1 Aug. 8, 2024

(30) Foreign Application Priority Data
May 18, 2021 (DE) ...................... 10 2021 112 894.3

(51) Int. Cl.
*B60P 7/13* (2006.01)
(52) U.S. Cl.
CPC .................................... *B60P 7/132* (2013.01)
(58) Field of Classification Search
CPC ...................................................... B60P 7/132
See application file for complete search history.

(56) References Cited

U.S. PATENT DOCUMENTS

| | | | | | |
|---|---|---|---|---|---|
| 4,108,081 | A | * | 8/1978 | Blanz ...................... | B60P 7/132 |
| | | | | | 410/82 |
| 4,352,613 | A | * | 10/1982 | Bertolini ................... | B60P 7/13 |
| | | | | | 410/82 |

(Continued)

FOREIGN PATENT DOCUMENTS

| | | |
|---|---|---|
| DE | 296461 A5 | 12/1991 |
| DE | 19720238 A1 | 11/1998 |

(Continued)

OTHER PUBLICATIONS

International Search Report issued on Jul. 21, 2022, in International Application No. PCT/DE2022/100337.

*Primary Examiner* — Taras P Bemko
(74) *Attorney, Agent, or Firm* — Patent Central LLC; Stephan A. Pendorf

(57) ABSTRACT

A container locking device for locking a container having a corner fitting to be transported on a loading surface of a vehicle, having a locking housing, a locking bolt and a drive. The locking bolt has a shaft and a locking head which, in the unlocked state, can be inserted through an opening of the corner fitting of the container and rotated 90° into the locked state in which it secures the container via protrusions which engage behind the opening of the corner fitting. The locking bolt is driven to be both axially displaceable and rotatable about its axis. The invention further relates to a container locking method that can be carried out using the above-mentioned device.

5 Claims, 8 Drawing Sheets

(56)                    References Cited

U.S. PATENT DOCUMENTS

|  |  |  |  |  |
|---|---|---|---|---|
| 5,575,599 A * | 11/1996 | Conlee | ...................... | B60P 7/13 |
|  |  |  |  | 410/70 |
| 5,931,617 A * | 8/1999 | Kroll | ...................... | B60P 7/132 |
|  |  |  |  | 410/94 |
| 6,092,967 A * | 7/2000 | Schulz | ................... | B60P 7/132 |
|  |  |  |  | 410/82 |
| 6,390,743 B1 * | 5/2002 | Metternich | ............... | B60P 7/13 |
|  |  |  |  | 410/82 |
| 12,515,578 B2 * | 1/2026 | Johansson | ............... | B60P 7/132 |
| 2015/0232015 A1 * | 8/2015 | Lanigan, Sr. | ........... | B60P 7/132 |
|  |  |  |  | 410/69 |
| 2017/0267160 A1 * | 9/2017 | Paulekuhn | ................ | B60P 7/13 |
| 2021/0394666 A1 * | 12/2021 | Newstead | .......... | B65D 90/0013 |
| 2025/0128654 A1 * | 4/2025 | Vähä-Piikkiö | .......... | B60P 1/483 |

FOREIGN PATENT DOCUMENTS

| DE | 20119415 U1 | 4/2003 |
|---|---|---|
| DE | 10202190 A1 | 8/2003 |
| DE | 102006002654 A1 | 8/2007 |
| DE | 102007007067 A1 | 8/2008 |
| EP | 1075400 B1 | 8/2004 |
| WO | 0051842 A1 | 9/2000 |

* cited by examiner

Fig. 6b
BC-BC ( 1 : 2 )
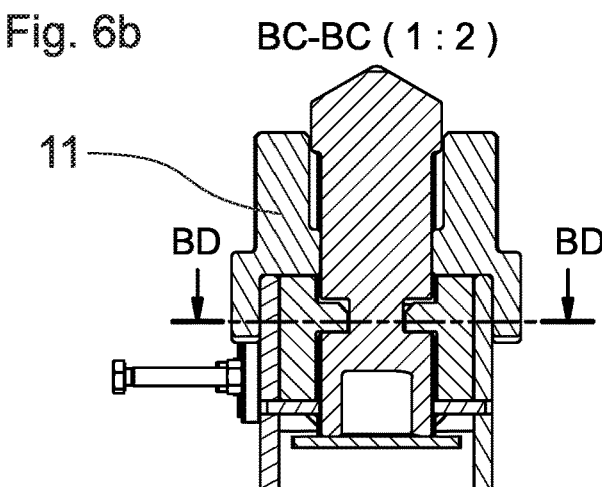
11
BD | BD
Fig. 6c
BD-BD ( 1 : 2 )
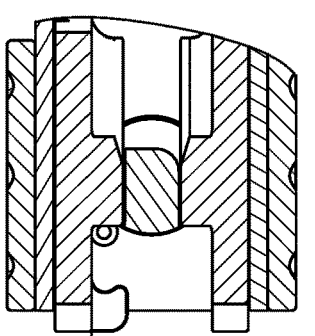
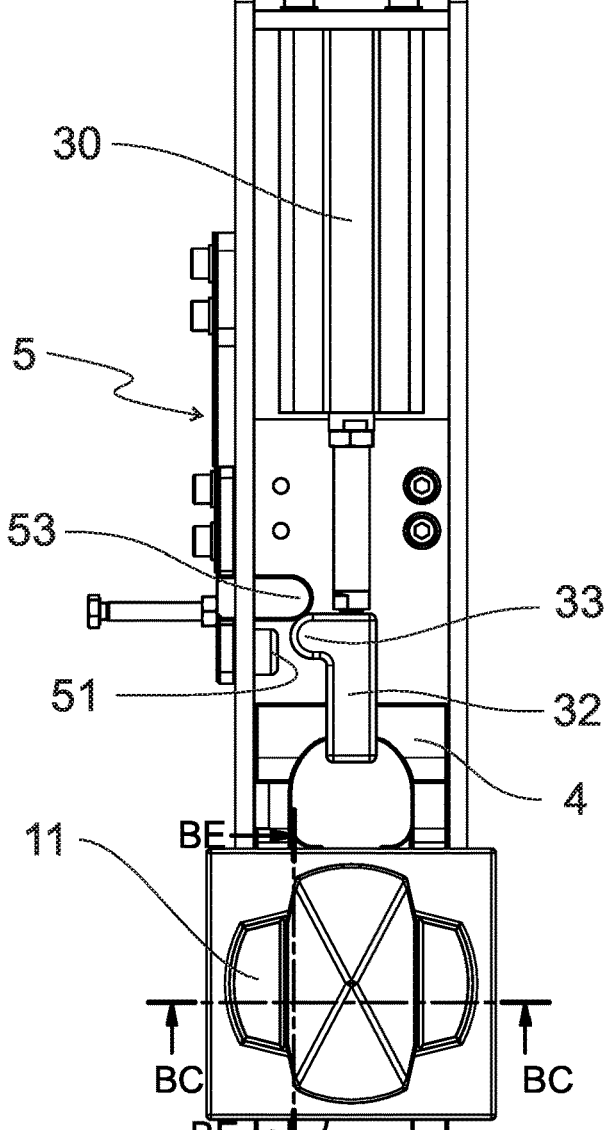
30
5
53
51
33
32
4
11
BE
BC | BC
BE
Fig. 6a
BE-BE ( 1 : 2 )
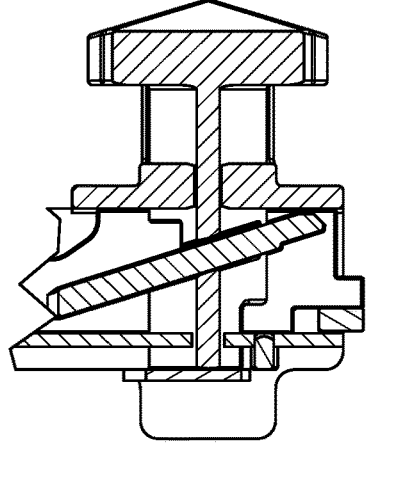
Fig. 6d

Y-Y ( 1 : 2 )

11

20

AB

AA

AB

AA ( 1 : 2 )

AB-AB ( 1 : 2 )

25

43

AC-AC ( 1 : 2 )

30

5

51

21

ACY

CONTAINER LOCKING DEVICE AND CONTAINER LOCKING METHOD

BACKGROUND OF THE INVENTION

Field of the Invention

The invention relates to a container locking device on a vehicle, for locking a container to be transported on a loading surface of the vehicle with a corner fitting, having a locking housing, a locking bolt and a drive, wherein the locking bolt has a shaft and a locking head which, in the unlocked state, can be inserted through an opening of the corner fitting of the container and in the locked state secures the container via protrusions which engage behind the opening of the corner fitting, the locking bolt with its shaft in the locking housing being both axially displaceable and rotatable about its axis, the shaft of the locking bolt is provided with a recess that is inclined tangential to its circumference, a wedge slide is mounted movable back and forth laterally in the locking housing, i.e. perpendicularly to the axis of the locking bolt, and can be driven by the drive, and the wedge slide has an inclined support which engages with the recess of the locking bolt during a lateral movement of the wedge slide and imparts an axial movement to the locking bolt. The invention further relates to a container locking method that can be carried out using the above-mentioned device.

Description of the Related Art

Such a locking device for containers on a vehicle is known from EP 1 075 400 B1. A membrane storage drive is proposed as the drive for the linear movement, which is only held in its working position when compressed air is applied and is returned to its relieved position by means of a spring when the pressure drops. Thus with this locking device it is necessary to first activate the drive by applying compressed air before loading the vehicle in order to bring the locking device into its unlocked state in order to then be able to load the container with its corner fitting via the unlocked locking head. When the pressure is released, the spring-loaded membrane accumulator is then returned to its basic position, causing the locking bolt to rotate and lower. The rotation of the locking bolt is achieved by means of a ring gear that engages in a rack. This locked state is held in its basic position solely by the spring loading of the membrane accumulator, which means that the lock could give way under strong external forces. Furthermore, the rotary drive for the locking bolt with a ring gear and rack is technically complex and prone to failure in rough everyday use.

DE 102 02 190 A1 describes a container-locking device similar to EP 1 075 400 B1, in which, however, the locking bolt does not have an ascending inclined support on its shaft that rises tangentially to its circumference, but rather two pairs of cams arranged laterally one above the other and offset. Furthermore, the device can have an additional securing device which in all positions of the locking bolt prevents the locking bolt (pivot pin) from being pulled out vertically in the direction of the container. The disadvantage is that the additional security has to be set and unlocked manually.

Furthermore, from DE 10 2006 002 654 A1 a device for actuating a lock of a locking head with a corner fitting of a container is known, which has a pneumatic piston-cylinder arrangement with which an extendable and lowerable claw of the locking head can be moved from a retracted position to an extended position and from there it has to be brought into the locking position and back again. Here too, a supplementary lock is not provided, so that the device is held in the locked position solely by the pneumatic drive.

From DE 10 2007 007 067 A1 a device for locking a container on a vehicle is known, in which the weight of a container placed on it is translated to a drive mechanism for the locking part, thereby achieving automated locking when the container is seated. To remove the container, however, a manual adjustment of a swivel lever is required to unlock the lock. An additional lock with a separate locking device is not implemented here.

The DE 201 19 415 U1 describes a device for selectively reciprocating drive parts of a mechanism for raising, lowering and rotating a locking bolt for locking with a fitting of a container by means of a pressure medium-operated piston-cylinder arrangement, with which a the locking head of a container locking mechanism is adjustable from a lowered position in which it does not protrude above the transport level of the receiving vehicle, to a raised position, with which the locking mechanism is prepared for receiving a container in an elevated position and can then be locked after loading the container.

DE 197 20 238 A1 describes a container locking device with a rotationally driven locking head, in which at the same time a horizontally movable plug pin for a so-called goose-neck container chassis is extended laterally with the rotary movement of a pinion gear segment.

The object of the invention is therefore to technically simplify the known container locking device described above and to make it safer.

BRIEF SUMMARY OF THE INVENTION

This task is solved with a container locking device and a container locking method as described below.

The fact that the locking bolt has a contact edge on its shaft, which cooperates with a thrust projection of the wedge slide in order to give the locking bolt a rotational movement of 90° during the lateral movement of the wedge slide, and a locking device is arranged on the locking housing, which is a spring-loaded lock which is designed to intrude in the lateral movement path of the wedge slide, the rotational movement for the locking bolt about its axis when moving the wedge slide is technically simply realized by the contact edge on its shaft, which interacts with the thrust projection of the wedge slide. The locking device activates a positive lock, which prevents the locking device from unintentionally reopening due to the lock in the movement path of the wedge carriage. This means that the lock of the container cannot open automatically, for example, even if the driving force for the drive is interrupted.

According to the method, the object is achieved in that when the locked state is reached, a lock biased with spring force intrudes in the lateral movement path of the wedge slide and the wedge slide is prevented from being reset.

If the drive has a double-acting pneumatic cylinder with a laterally movable piston rod, the piston rod being operatively connected to the wedge slide in such a way that an idle stroke occurs during the first part of the stroke movement of the drive and the lateral movement of the wedge slide occurs during the second part of the stroke movement, the wedge slide is initially activated only in second part of the stroke movement.

The fact that the locking device has a release mechanism for the lock, which releases the lock during the idle stroke, makes it possible for the locking device to be released during the idle stroke, i.e. in the first part of the stroke movement of the piston rod, so that the locking device can be opened from the locked state to the unlocked state.

In the event that there is insufficient compressed air resource and/or an error in the compressed air supply or the pneumatic cylinder, an emergency release is provided with which the positive lock of the locking device can be unlocked.xx In a further embodiment, the emergency release has two push elements equipped with external threads, in which the first push element can be screwed into a first threaded hole in the locking device and the second push element can be screwed into a second threaded hole in the locking housing, the first push element releasing the lock and the second push element displacing the wedge slide to open the lock. Thus, the locking device can be released with the first thrust element and the locking device can be adjusted from the locked state to the unlocked state with the second thrust element without the need for force actuation via the pneumatic cylinder (emergency unlocking). Accordingly, a container can be unloaded by manually operating the emergency release even if the pneumatic system fails.

According to the method, the container locking method is characterized in that an idle stroke is carried out during a first part of the stroke movement of the drive and the wedge slide is moved during a second part of the stroke movement, whereby when unlocking a container from the locked state to the unlocked state during the first part of the stroke movement in the idle stroke the lock is released and then during the second part of the stroke movement the wedge slide is moved back, whereby the locking bolt is first raised and then turned back into the unlocked state.

BRIEF DESCRIPTION OF THE SEVERAL VIEWS OF THE DRAWINGS

An exemplary embodiment of the invention is described in detail below with reference to the accompanying drawings.

They show.

DETAILED DESCRIPTION OF THE INVENTION

Figure 1:
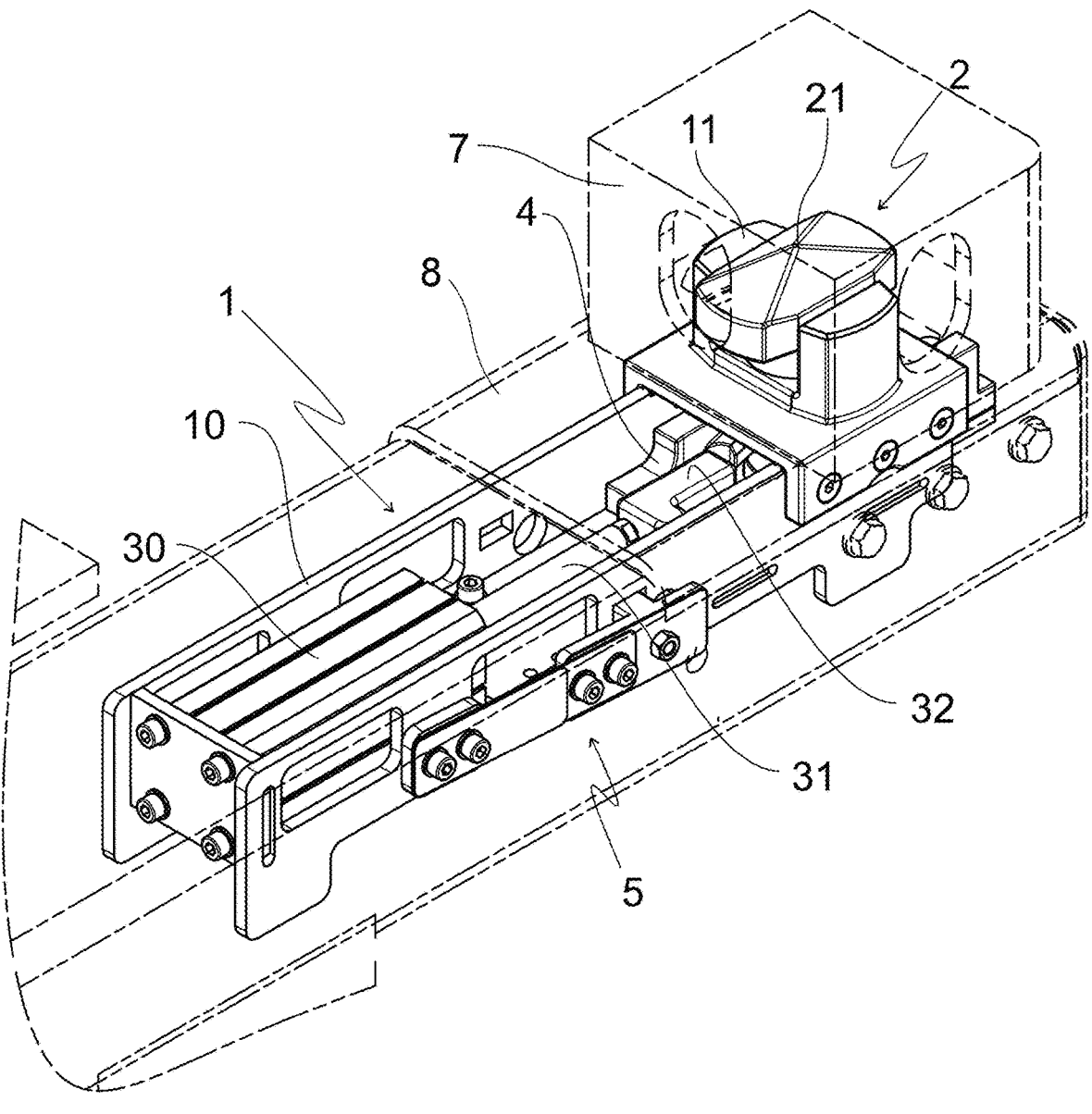
FIG. 1 a spatial view of a locking device.

FIG. 1 shows a spatial view of an embodiment of the container locking device, which is provided on a loading surface 8 of a vehicle on which a container to be transported is to be placed. The locking device has a locking housing 1, which has an elongated drive box 10 and at one end a guide component 11 with a load support surface 12 provided thereon. The guide component 11 projects beyond the loading surface 8. The upwardly projecting guide component 11 fits into a corner fitting 7 of the container, so that the container rests on the loading surface 8, in particular the load support surface 12, so that it cannot slip.

To lock the loaded container, a locking bolt 2 is provided, which is mounted axially displaceable and rotatable in a central and vertical axis Z (see FIG. 2e) in the guide component 11. The locking bolt 2 has a cylindrical shaft 20, which is mounted and held in the locking housing 1 in an axially displaceable and rotatable manner. Furthermore, the locking bolt 2 at the upper end of the shaft 20 has a locking head 21, which has a mushroom-like but elliptical contour and, in an unlocked state, rests congruently on the guide component 11 and can be adjusted into a locked state, in which the locking head 21 is rotated 90° and lowered, so that the projections now protruding from the elliptical locking head 21 above the guide component 11 engage behind the corner fitting Z of the loaded container. In FIG. 1 the container locking device is shown in the locked state.

The exact mode of operation and the components of the container locking device required for this are shown in FIGS. 2 to 7 in a top view of the container locking device (in each case in sub-figure a) and several cross sections and possibly a bottom view (in the other sub-figures b, c, d and possibly e).

Figures 2A, 2B, 2C, 2D, 2E:
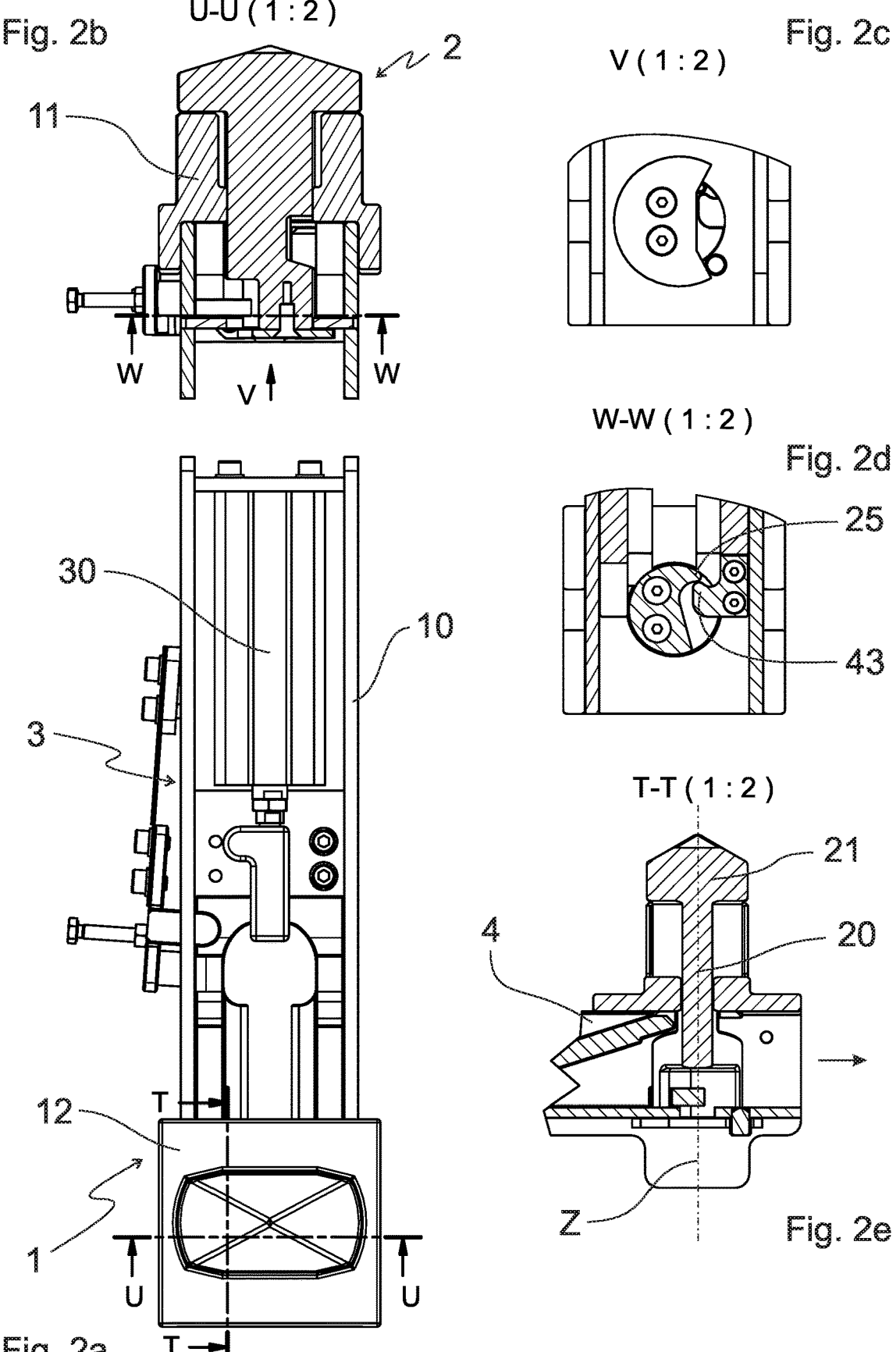
FIG. 2a to e a top view and correspondingly marked cross sections through a locking device according to FIG. 1 in the unlocked state, FIG. 3a to d the device shown in FIG. 1 during actuation and the start of the adjustment to the locked state, FIG. 4a to d the corresponding view and cross sections in the state during the adjustment of the locking device into the locked state, FIG. 5a to d the corresponding view and cross sections when the locked state is reached, FIG. 6a to d the view and associated cross sections at the start of unlocking the locking device (idle stroke), FIG. 7a to e the view as well as associated cross sections and view from below when the locking bolt reaches the raised position, FIG. 8a to e views analogous to FIG. 7 and correspondingly assigned cross sections of the locking device when the locking bolt is being turned back in the direction of its unlocked state.

In FIG. 2 the container locking device is shown in its unlocked state, in which a container can be unloaded or loaded. This can be seen from the fact that the locking bolt 2 with its shaft 20 is in an elevated position, i.e. shifted axially upwards, and the locking head 21 belonging to the locking bolt 2 rests on the guide component 11, as can be seen in particular from FIGS. 2a and 2b. Accordingly, a container with its corner fitting 7 and its elongated hole formed therein can be loaded onto the loading surface 8 and in particular onto the load support surface 12 via the locking head 21 and the guide component 11 or can be lifted from the loaded position, since the locking head 21 is aligned with the guide component 11 (see top view FIG. 2a).

Furthermore, in FIG. 2a, the drive 3 can be seen in top view in the form of a double-acting pneumatic cylinder 30, which is arranged in the elongated drive box 10 of the locking housing 1. The double-acting pneumatic cylinder 30 has a piston rod 31, which interacts via a drive claw 32 on a wedge slide 4 that can be moved back and forth in the elongated drive box 10.

Figure 3D:
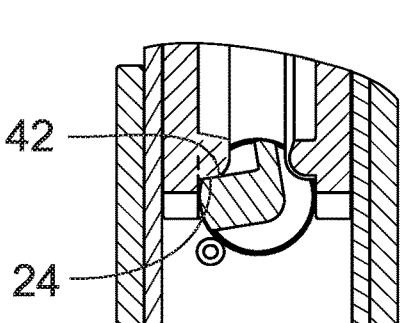
Figure 3D:
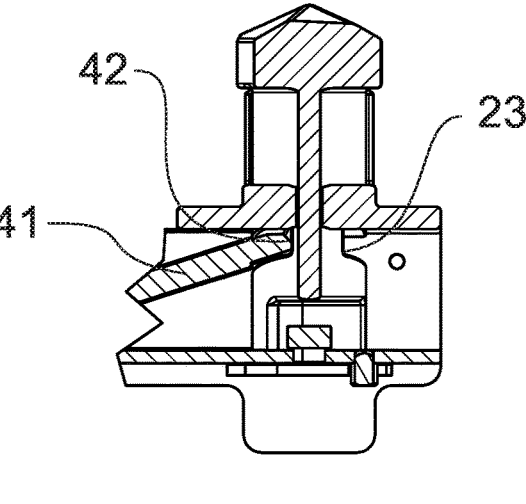

The wedge slide 4 has a inclined support 41, which is shown in plan in FIG. 2a and in section in FIG. 2e. The inclined support 41 has a pushing protrusion 42 at its upper end, which interacts with a contact edge 24 on the shaft 20 of the locking bolt 2 in such a way that when the pneumatic cylinder 30 is actuated and the wedge slide 4 moves in the plane of the drawing in FIG. 2e from left to right, the pushing protrusion 42 comes into contact with the contact edge 24 and as the wedge slide 4 moves further in the lateral direction according to FIG. 3d to the right, the locking bolt 2 is rotated about its axis Z. In FIG. 3, this situation is shown in a top view (FIG. 3a) and three cross sections (FIG. 3b to d).

Figures 4A, 4C, 4D:
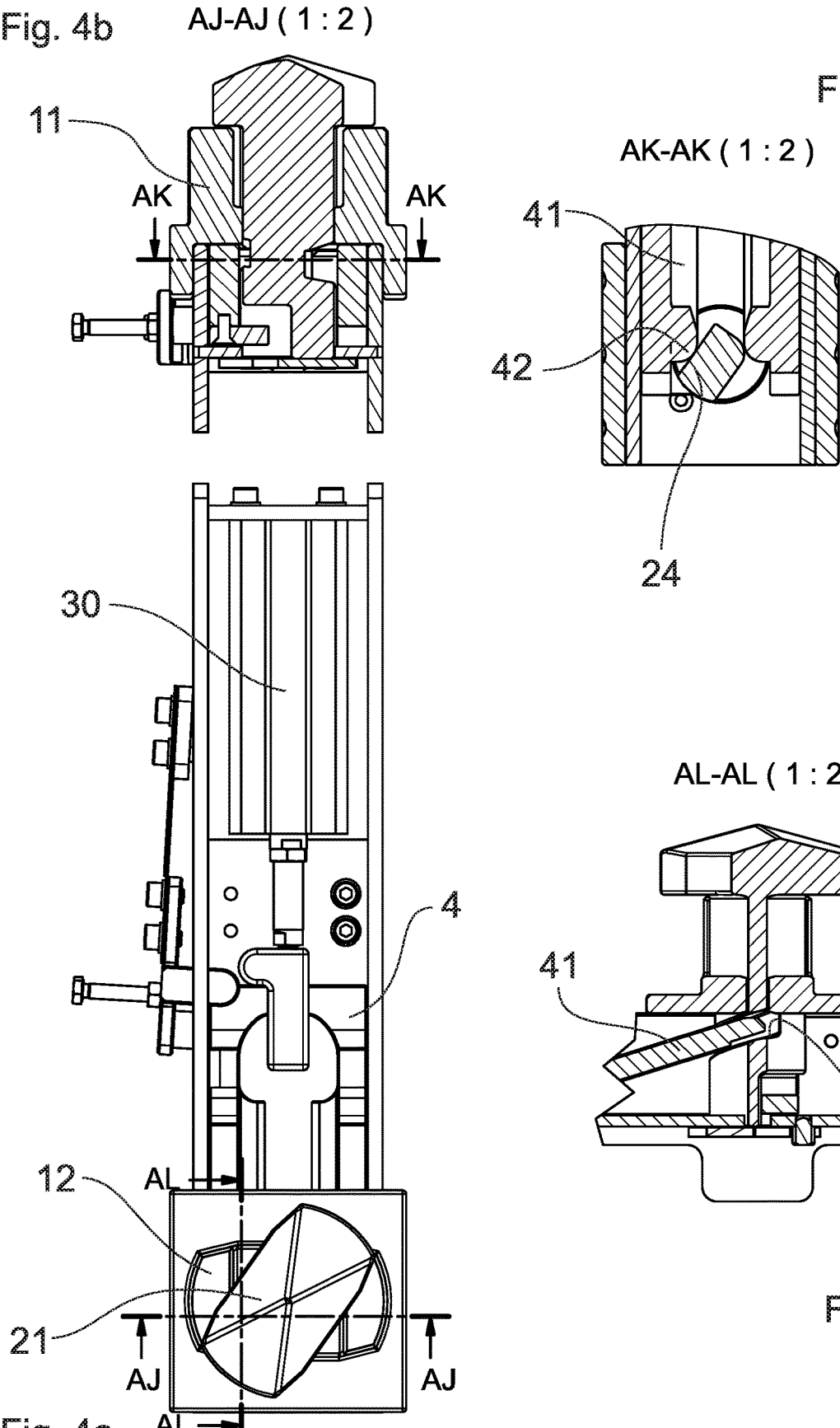

With further lateral displacement of the wedge slide 4 to the right in the drawing plane of FIGS. 2e, 3d, 4d and 5d, the locking bolt 2 is further rotated about axis Z at its recess made on the circumference of the shaft 20 with the pushing protrusion 42 resting on the contact edge 24, as can also be seen from the top view in FIG. 4a. This situation can also be seen in FIG. 3c and FIG. 4c, with recesses 23 arranged tangentially slanted on both sides of the shaft 20 being provided in the exemplary embodiment shown here, since the wedge slide 4 correspondingly has two protruding inclined supports 41, which are engaged with the recesses 23 on the shaft on both sides 20 of the locking bolt 2.

Figures 5A, 5B, 5C, 5D:
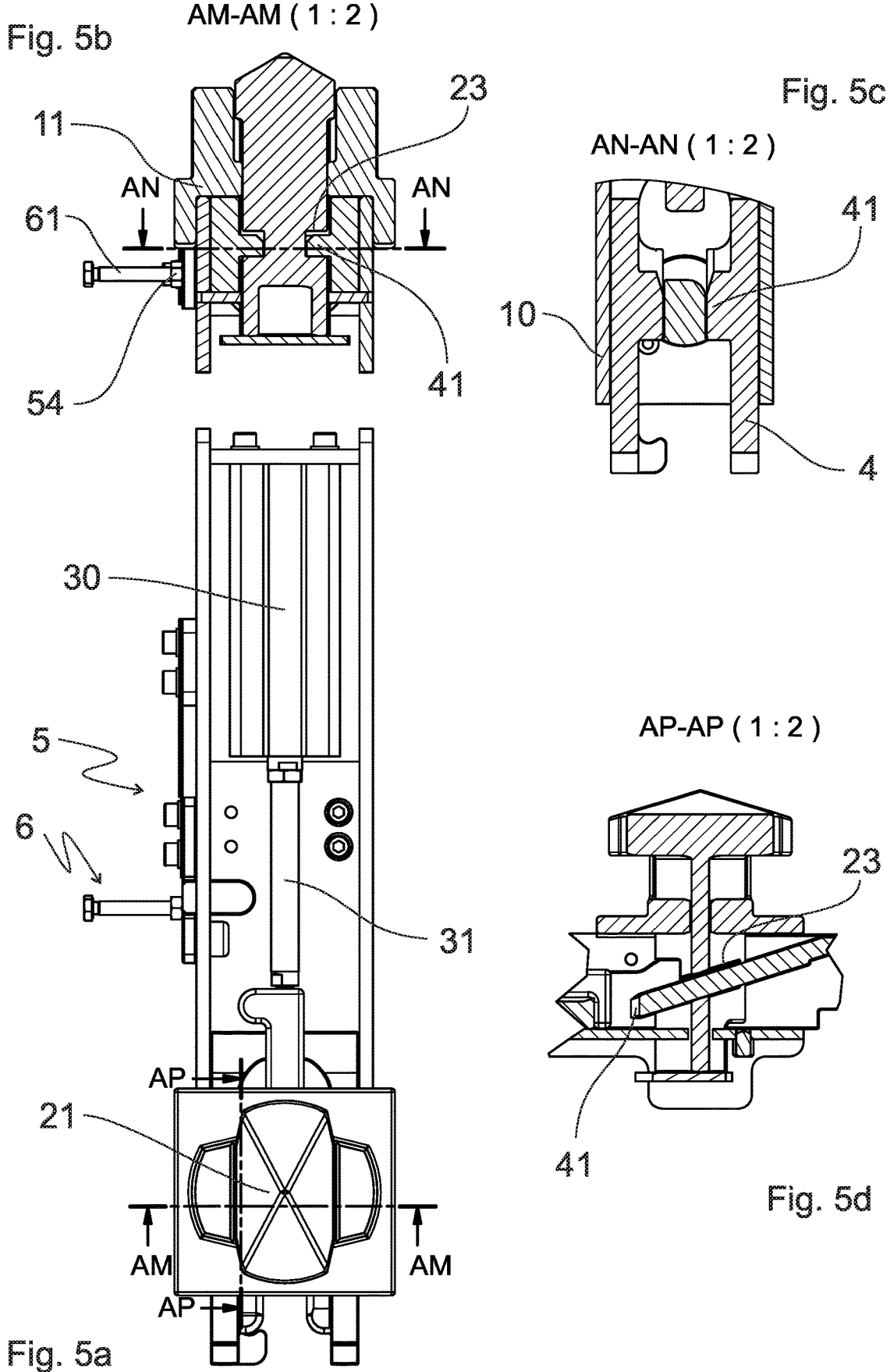

When the wedge slide 4 moves further to the right in the drawing plane in FIG. 4d or downwards in the drawing plane in FIG. 4a under force from the pneumatic cylinder 30, the locked state shown in FIG. 5 is arrived at (FIG. 5a) in which the locking bolt 2 is completely rotated by 90° (FIG. 5a) and due to further lateral advance of the wedge slide 4 has already sunk with its locking head 21 between the two protruding parts of the guide component 11 (FIG. 5b). The engagement of the two inclined supports 41 in the two recesses 23 on the shaft 20 of the locking bolt 2 can be seen particularly well in FIGS. 5b and 5c.

Furthermore, reference is made to a locking device 5, which is arranged on the outside of the elongated drive box 10 of the locking housing 1 and has a lock 51 which, under force of a leaf spring 52, engages in a bore of the elongated drive box 10 in such a way that when the end position is reached in a locked state (FIG. 5) it intrudes into the path of the wedge slide 4 and forms a positive lock there against unwanted releasing of the lock.

To release the container lock from the locked state back to the unlocked state, beginning with FIG. 5 (locked condition), the double-acting pneumatic cylinder 30 is activated to retract the piston rod 31 whereby initially a short idle stroke of the piston rod 31 occurs, in which the drive claw 32 is moved from its push position to the pull position and, with a trigger projection 33 on the drive claw 32, comes into contact with a displacement component 53 of the locking device 5. During the already transpired first movement of the wedge slide 4, as can be seen from comparing FIG. 5a with 6a, the locking bolt 2 is already slightly raised via the inclined supports 41, which are guided in the recesses 23 of the shaft 20 (see FIGS. 6b, 6c and 6d).

Figures 7A, 7B, 7C, 7D, 7E:
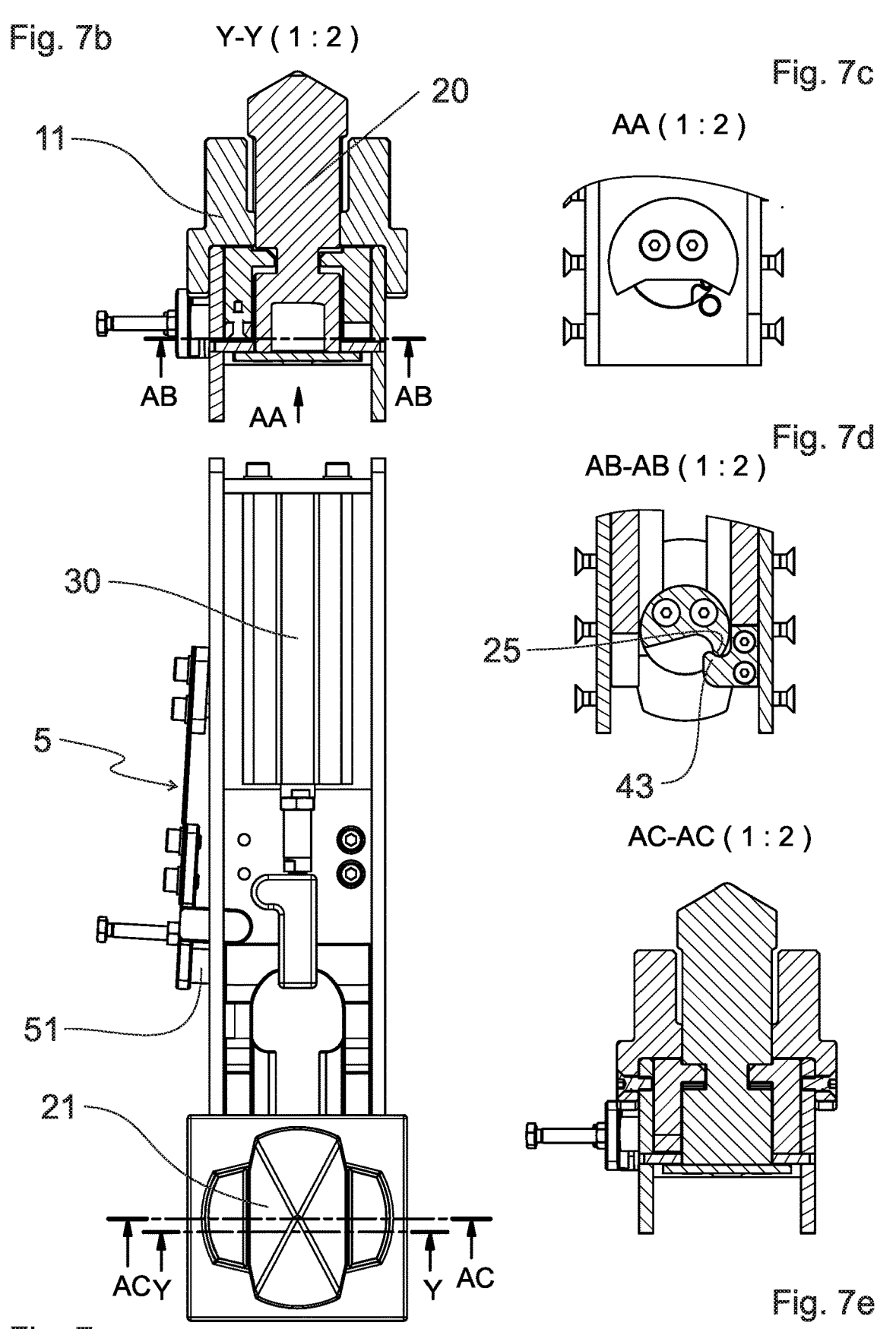

During the further movement, namely retraction of the piston rod 31 into the pneumatic cylinder 30, according to FIG. 7a in comparison to FIG. 6a, the trigger projection 33 on the drive claw 32, via the displacement component 53 of the locking device 5, pushes the lock 51 outwards (to the left in the plane of the drawing in FIGS. 6a, 7a) against the force of the leaf spring 52, whereby the movement space for the wedge slide 4 in the elongated drive box 10 is freed and the wedge slide 4 prevents the lock 51 biased by the leaf spring 52 from snapping back. The locking bolt 2 is raised completely in the axial direction, so that the projections of the locking head 21 lie above the guide component 11 (FIGS. 7b and 7e) and the locking head 21 can now be rotated back. For this purpose, in FIG. 7d, a driving projection 43 on the wedge slide 4 is in contact with a counter bearing 25 on the shaft 20 of the locking bolt 2.

Figures 8A, 8B, 8D, 8E:
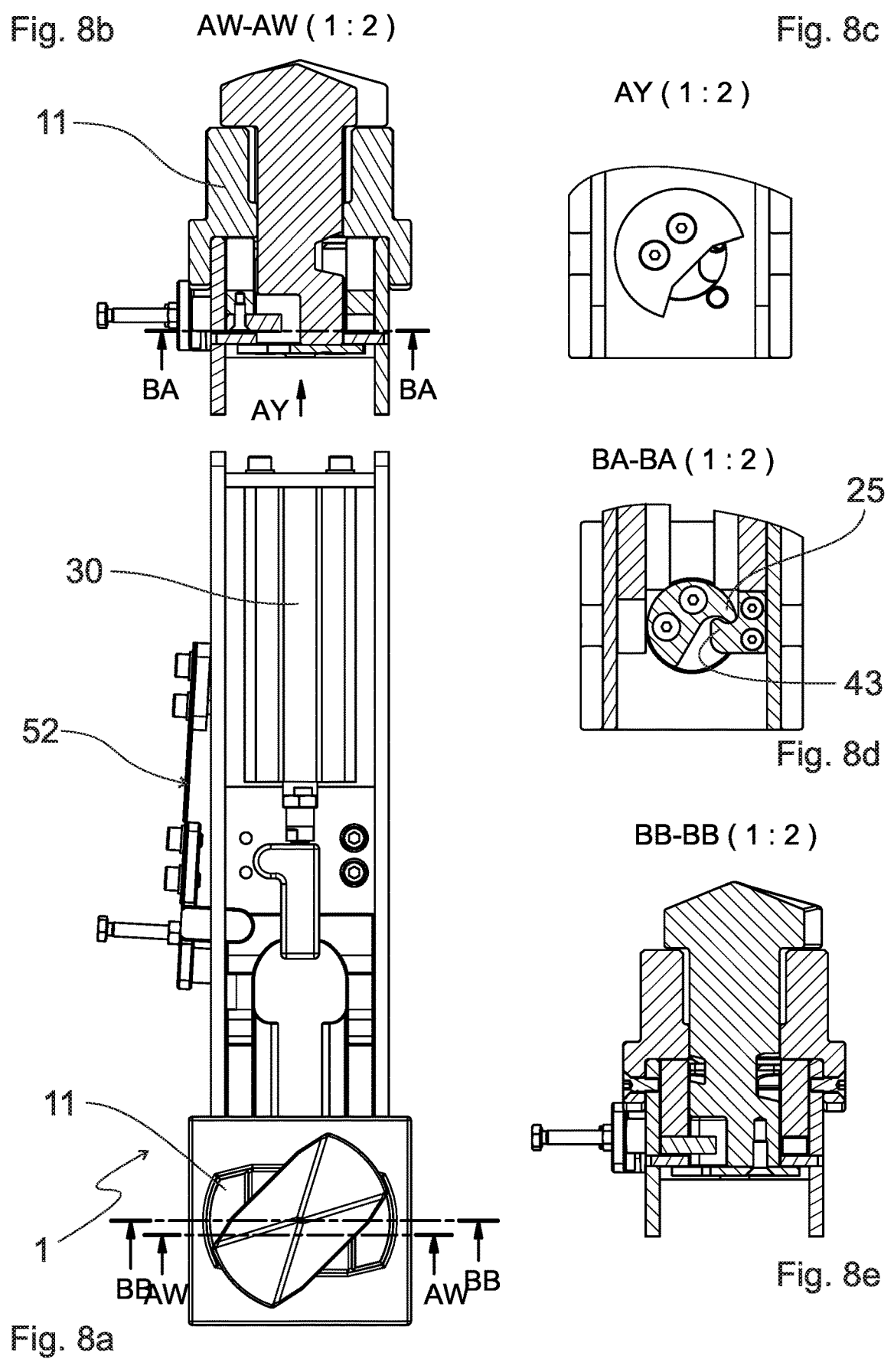

With a further reset progress of the pneumatic cylinder 30, i.e. almost complete retraction of the piston rod 31, with further lateral displacement of the wedge slide 4 with the lateral movement of the driving projection 43, the rotatably mounted locking bolt 2 rotates due to the driving contact with the counter bearing 25 on the shaft 20, as shown in FIGS. 8d and 8a in plan view and FIGS. 8b and 8e in cross section. Correspondingly, the locking bolt 2 (see FIG. 2d) rotates back into its unlocked state so that the locking head 21 lies flush over the guide component 11, as shown in the top view in FIG. 2a (unlocked state, compare FIGS. 2a to e).

Furthermore, an emergency release 6 (see FIG. 5a) is arranged on the container locking device, which has a first push element 61 on the locking device 5, the first push element 61 being a screw which is arranged in a first threaded hole 54 (see FIG. 5b) of the locking device 5, so that when the first push element 61 is screwed into this first threaded hole 54, the lock 51 is moved out of the lateral movement path of the wedge slide 4 against the force of the leaf spring 52. Now, with a second thrust element, not shown here, which can be screwed into a threaded hole on the outer end face of the elongated drive box 10 (not shown here), the wedge slide 4 can be manually unlocked and restored to its unlocked condition according to FIGS. 2a to e, for example if the compressed air supply fails or the pneumatic cylinder is damaged.

REFERENCE SYMBOL LIST 1 locking housing
7 corner fitting
8 loading surface
10 elongated drive box
11 guide component
12 load support surface
2 locking bolts
20 shaft
21 locking head
23 recess
24 contact edge
25 counter bearings
3 drive
30 double-acting pneumatic cylinder
31 piston rod
32 drive claw
33 trigger projection
4 wedge slide
41 inclined support
42 pushing protrusion
43 driving projection
5 locking device
51 lock
52 leaf spring
53 displacement component
54 first threaded hole
6 emergency release
61 first push element
Z axis

The invention claimed is:

1. A container locking device (5) on a vehicle, adjustable between a locked state for locking a container with a corner fitting (7) to be transported on a loading surface (8) of the vehicle and an unlocked state in which a container can be unloaded or loaded, having a locking housing (1), a locking bolt (2) and a drive (3), wherein the locking bolt (2) has a shaft (20) and a locking head (21), which in an unlocked state of the locking bolt (2) can be inserted via an opening in the corner fitting (7) of the container and in a locked state of the locking bolt (2) secures the container via projections engaging behind the opening in the corner fitting (7), the locking bolt (2) is mounted with the shaft (20) of the locking bolt (2) in the locking housing (1) so that the locking bolt (2) can be moved both axially and rotatably about an axis of the locking bolt (2), the locking bolt (2) is provided on the shaft (20) with a recess (23) that is inclined tangential to a circumference of the recess (23), a wedge slide (4) is mounted in the locking housing (1) laterally, i.e. perpendicular to the axis of the locking bolt (2), so that the wedge slide (4) can be moved back and forth and can be driven by the drive (3), the wedge slide (4) has an inclined support (41) which engages with the recess (23) of the locking bolt (2) during the lateral movement of the wedge slide (4) and gives the locking bolt (2) an axial movement, the locking bolt (2) has a contact edge (24) on the shaft (20), which cooperates with a pushing protrusion (42) of the wedge slide (4) to give the locking bolt (2) a 90° rotational movement during the lateral movement of the wedge slide (4), the locking device (5) is arranged on the locking housing (1), which has a spring-loaded lock (51) which is designed to intrude in the lateral movement path of the wedge slide (4), the drive (3) has a double-acting pneumatic cylinder (30) with a laterally movable piston rod (31), the piston rod (31) being operatively connected to the wedge slide (4) in such a way that during a first part of the stroke movement of the drive (3) an idle stroke takes place and in a second part of the stroke movement the lateral movement of the wedge slide (4) takes place, and the locking device (5) has a release mechanism for the lock (51), which releases the lock (51) during the idle stroke.

2. The container locking device (5) according to claim 1, wherein an emergency release (6) is provided with which the form-fitting lock (51) of the locking device (5) can be unlocked.

3. The container locking device (5) according to claim 2, wherein the emergency release (6) has first and second push elements (61) equipped with external threads, wherein the first push element (61) can be screwed into a first threaded hole (54) in the locking device (5) and the second push element can be screwed into a second threaded hole in the locking housing (1), the first push element (61) releasing the lock and the second push element displacing the wedge slide (4) to open the lock.

4. A method for locking a container with a corner fitting (7) to be transported on a loading surface (8) of the vehicle, the method comprising seating the container with the corner fitting (7) onto the loading surface (8) of the vehicle, and releasably locking the container to the vehicle using a container locking device (5) adjustable between a locked state for locking the container with the corner fitting (7) to be transported on a loading surface (8) of the vehicle and an unlocked state in which a container can be unloaded or loaded, the container locking device (5) comprising a locking housing (1), a locking bolt (2) and a drive (3), wherein the locking bolt (2) has a shaft (20) and a locking head (21), which in an unlocked state of the locking bolt (2) can be inserted via an opening in the corner fitting (7) of the container and, in a locked state of the locking bolt (2), secures the container via projections that engage behind the opening of the corner fitting (7), the locking bolt (2) with the shaft (20) is both axially displaced in the locking housing (1) and rotatable about an axis of the locking bolt (2), a wedge slide (4) in the locking housing (1) can be moved back and forth laterally by the drive (3), i.e. perpendicular to the axis of the locking bolt (2), and during the lateral movement of the wedge slide (4) by the drive (3) of the wedge slide (4), the locking bolt (2) first rotates axially by 90° when adjusting from the unlocked state to the locked state and then axially downwards to be lowered towards the loading surface (8), wherein when the locked state is reached, a spring-loaded lock (51) intrudes in the lateral movement path of the wedge slide (4) and prevents the wedge slide (4) from being reset, and wherein during a first part of the stroke movement of the drive (3) an idle stroke is carried out and during a second part of the stroke movement the wedge slide (4) is moved, whereby when unlocking a container from a locked state to an unlocked state of the container, the lock (51) is released during the first part of the stroke movement in the idle stroke and then during the second part of the stroke movement the wedge slide (4) is moved back whereby the locking bolt (2) is initially raised and then turned back to the unlocked state of the locking bolt (2).

5. The method according to claim 4, the method further comprising, upon failure of the drive (3), releasing the lock (51) mechanically by means of an emergency release (6) and mechanically resetting the locking bolt (2) to the unlocked state of the locking bolt (2).

* * * * *